No. 625,451. Patented May 23, 1899.
R. W. LYLE.
UNDERGROUND CONDUIT.
(Application filed Mar. 22, 1899.)

(No Model.)

Witnesses:
Robt Everett
J Granville Meyers

Inventor:
Robert W. Lyle.
By Davis & Co
Attys.

THE NORRIS PETERS CO., PHOTO-LITHO., WASHINGTON, D. C.

UNITED STATES PATENT OFFICE.

ROBERT W. LYLE, OF PERTH AMBOY, NEW JERSEY, ASSIGNOR TO THE STANDARD FIRE-PROOFING COMPANY, OF SAME PLACE.

UNDERGROUND CONDUIT.

SPECIFICATION forming part of Letters Patent No. 625,451, dated May 23, 1899.

Application filed March 22, 1899. Serial No. 710,131. (No model.)

*To all whom it may concern:*

Be it known that I, ROBERT W. LYLE, a citizen of the United States, residing at Perth Amboy, in the county of Middlesex and State of New Jersey, have invented a certain new, useful, and valuable Improvement in Underground Conduits, of which the following is a full, clear, and exact description.

My present invention relates particularly to that class of underground conduits which are employed to inclose and protect electric wires or cables, and has for its object to provide the novel and useful construction and combination of parts such as will be hereinafter fully described.

Figure 1:
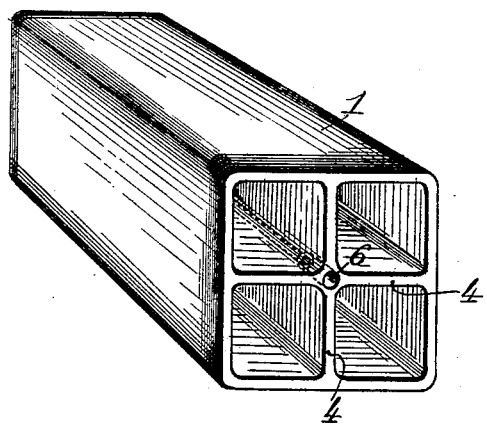
Figure 2:
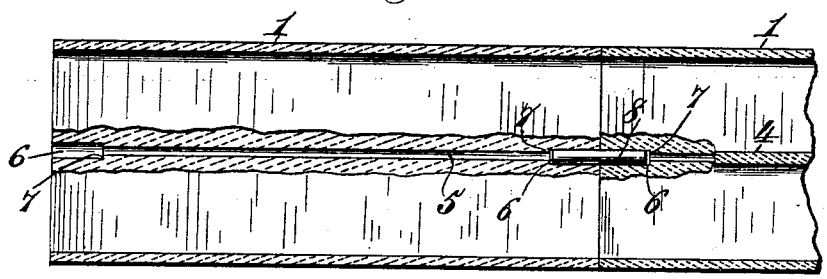
Figure 3:
Figure 4:

In the accompanying drawings, Figure 1 is a perspective view of a section of conduit having my improved form of centering-hole therein. Fig. 2 is a longitudinal sectional view showing my improved form of dowel-pin in position. Fig. 3 is a perspective view showing my improved form of centering-pin. Fig. 4 shows the old form of dowel-pin heretofore used.

Heretofore conduits having centering-holes of a uniform diameter passing entirely therethrough have been employed, and dowel-pins 2, having a collar, shoulder, or flare 3 centrally secured or formed thereon, as shown in Fig. 4, have been used in order to prevent such pin from being forced clear into the centering-hole upon the adjacent section being placed in position. Such dowel-pins are in themselves comparatively expensive on account of the necessity of its central shoulder or collar, and these shoulders prevent the adjacent faces of two connecting conduits from coming closely together and forming a tight joint, which is obviously a great objection.

My improved form of conduit 1, which comprises the usual shell or body made of terracotta or other suitable material and divided into sections or ducts by crossing partitions 4, is provided at the intersection of said partitions with a longitudinal centering-hole 5, Fig. 2, extending entirely therethrough, and at each end of the conduit said longitudinal centering-hole 5 is enlarged or reamed out, as at 6, for a distance of about two inches, so as to form an interior shoulder or abutment-wall 7 at each end of the conduit, against which the opposite ends of a dowel-pin 8 strike when said pin is placed within the said enlarged openings 6 of two adjacent or contacting conduits. This arrangement of abutting shoulders prevents the dowel-pin 8 from being forced farther than desired into the centering-hole 5 and insures a projection at all times of a portion of the pin beyond the face of the conduit, and thus allowing the next or adjacent conduit to dowel thereon without loss of time and at the same time insuring a perfect and close juncture of the two conduits, which latter feature is an important consideration in the construction and building of conduit-lines.

As my improved conduit permits the use of perfectly-plain dowel-pins without central shoulders or collars, the cost of such pins is merely nominal.

The enlarged portions 6 of the centering-hole are preferably formed as a separate operation after the conduit comes from the die, and in use the dowel-pins should somewhat closely fit within these said enlarged portions. Furthermore, it is desirable to make the ends of the dowel-pins blunt or flat, so that they will not break or injure the shoulders 7 when adjusting or setting the tiles in position.

What I claim, and desire to secure by Letters Patent, is—

1. A tile-section for electric wires or the like, having a dowel-pin opening in each end thereof formed to provide internal abutment-shoulders, said openings being of uniform diameter throughout, substantially as described.

2. A conduit for electric wires or the like comprising tile-sections each having a plurality of longitudinal ducts extending entirely therethrough, and a dowel-opening formed in each end of the said tile-sections, the inner ends of said openings terminating in abrupt abutment-shoulders, and a solid dowel-pin of uniform diameter throughout arranged in the said dowel-openings of two adjacent tile-sections, said dowel-pins being held against longitudinal movement by the said abutment-shoulders.

3. In an underground conduit, the combination with a series of abutting tile-sections, each section having a longitudinal centering-hole extending entirely therethrough, the extremities of which, in each section, are enlarged to provide internal abutment-shoulders, and dowel-pins arranged in the said enlarged openings at the adjacent ends of said sections, said dowel-pins being held against longitudinal movement by the said abutment-shoulders.

In testimony whereof I have hereunto set my hand in presence of two subscribing witnesses.

ROBERT W. LYLE.

Witnesses:
  A. D. CUSHING,
  F. H. WIGGINS.